US010551995B1

United States Patent
Ho et al.

(10) Patent No.: US 10,551,995 B1
(45) Date of Patent: Feb. 4, 2020

(54) OVERLAY USER INTERFACE

(71) Applicant: Twitter, Inc., San Francisco, CA (US)

(72) Inventors: Edward Ho, Palo Alto, CA (US);
Gordon Luk, Cupertino, CA (US);
Todd Jackson, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 168 days.

(21) Appl. No.: 14/499,079

(22) Filed: Sep. 26, 2014

Related U.S. Application Data

(60) Provisional application No. 61/883,134, filed on Sep. 26, 2013.

(51) Int. Cl.
*G06F 3/048* (2013.01)
*G06F 3/0481* (2013.01)
*G06F 3/0486* (2013.01)
*G06F 3/0482* (2013.01)
*G06F 3/0488* (2013.01)

(52) U.S. Cl.
CPC ........ *G06F 3/04817* (2013.01); *G06F 3/0482* (2013.01); *G06F 3/0486* (2013.01); *G06F 3/0488* (2013.01)

(58) Field of Classification Search
CPC ............... G06F 3/04842; G06F 3/0482; G06F 3/04817; G06F 3/0488; G06F 3/04883; G06F 3/0481; G06F 3/0416; G06F 3/04845; G06F 17/212; G06F 2203/04803; G06F 3/0486; H04N 1/0044
USPC .......................................................... 715/768
See application file for complete search history.

(56) References Cited

U.S. PATENT DOCUMENTS

| 9,798,443 | B1 * | 10/2017 | Gray | G06F 3/0482 |
| 2005/0268301 | A1 * | 12/2005 | Kelley | G06F 9/4843 718/100 |
| 2008/0248815 | A1 | 10/2008 | Busch | |
| 2010/0295805 | A1 * | 11/2010 | Shin | G06F 3/04883 345/173 |
| 2011/0175930 | A1 * | 7/2011 | Hwang | G06F 3/0481 345/629 |
| 2011/0258582 | A1 * | 10/2011 | Bang | G06F 3/04817 715/811 |
| 2013/0145295 | A1 * | 6/2013 | Bocking | G06F 3/017 715/764 |

(Continued)

*Primary Examiner* — Renee D Chavez
*Assistant Examiner* — Jianmei F Duckworth
(74) *Attorney, Agent, or Firm* — Brake Hughes Bellermann LLP

(57) ABSTRACT

In a general aspect, a computer-implemented method can include displaying a first user interface window on a touch-screen display of a computing device, where first user interface window includes a plurality of application icons associated with respective applications available for execution by the computing device. The computer-implemented method can further include detecting a touch input on the touchscreen display at a location associated with a first application icon from the plurality of application icons. The computer-implemented method can also include, in response to the touch input, displaying concurrently on the touchscreen display of the computing device a first portion of the first user interface window and a second portion of a second user interface window, wherein the second user interface window displays a user interface of the application associated with the first application icon.

34 Claims, 12 Drawing Sheets

(56) References Cited

U.S. PATENT DOCUMENTS

| | | | |
|---|---|---|---|
| 2013/0155116 A1* | 6/2013 | Paretti | G09G 5/14 345/667 |
| 2013/0205366 A1 | 8/2013 | Luna et al. | |
| 2013/0246970 A1* | 9/2013 | Helle | G06F 3/0482 715/822 |
| 2013/0267209 A1 | 10/2013 | Bott | |
| 2013/0326583 A1* | 12/2013 | Freihold | G06F 3/04815 726/3 |
| 2014/0006517 A1 | 1/2014 | Hsiao et al. | |
| 2014/0137020 A1* | 5/2014 | Sharma | G06F 3/0486 715/769 |
| 2014/0189592 A1* | 7/2014 | Benchenaa | G06F 3/04886 715/835 |

\* cited by examiner

OVERLAY USER INTERFACE

CROSS-REFERENCE TO RELATED APPLICATIONS

This application claims the benefit of U.S. Provisional Application No. 61/883,134, titled "OVERLAY USER INTERFACE", filed on Sep. 26, 2013, and U.S. Provisional Application No. 61/883,128, titled "RANKING OF APPLICATIONS", filed on Sep. 26, 2013, the disclosures of which are incorporated by reference herein in their entirety. This application is also related to U.S. application Ser. No. 14/499,083, titled "CONTEXT AWARE APPLICATION MANAGER", filed on Sep. 26, 2014, the disclosure of which is incorporated by reference.

TECHNICAL FIELD

This disclosure generally relates to providing an overlay user interface (UI) on a computing device.

BACKGROUND

The use of computing devices has greatly increased in recent years. Computing devices such as tablet computers, smart phones, cellular phones, and netbook computers, are now commonplace throughout society. Computing devices can also include, for example, cars, planes, household appliances, and thermostats. With this increase in the number of computing devices, the number of applications has also greatly increased. Software developers have created new applications to meet the varying needs and requirements of users. For example, map applications allow users to navigate from one location to another, game application allow users to play video games on their computing device, social networking applications allow users to connect to a social network to post/share content, a calorie tracking application may allow users to track the amount of calories are in the food the users eat, etc.

On a computing device (e.g., a tablet, a smart phone, a laptop computer a PDA, etc.) applications can be represented by a visual icon that is displayed by the computing device. Selecting the icon (e.g., by tapping or double tapping the icon) can launch the application for use by the user. A user may often have so many applications installed on a computing device that the icons representing the applications do not fit on a single page of the display of the computing device.

Although users have a multitude of applications, most users do not spend a lot of time or effort organizing the icons that represent their applications. As a user installs different applications onto a computing device, the computing device may automatically arrange icons for the applications in the order in which they were downloaded and/or installed. Because users may not organize their applications, it may be hard for users to access applications easily and/or quickly when they need to. This may be frustrating to users, who often open different applications tens, or hundreds, of times per day. In addition, switching between different applications tens, or hundreds, of times per day, and going through the process of locating an application, launching the application, closing the application, locating another application, launching the other application, etc. may be irritating to a user, especially when the user may interact with an application for only a few seconds before moving on to another application.

Furthermore, many computing devices include a lock screen. A lock screen may be a user interface element that may control access to a computing device. A user may perform an action to unlock the lock screen and gain access to the device. For example, the user may enter a password, perform a gesture using a touch object 122 (e.g., swiping a finger across the screen), or click a button on the screen to unlock the lock screen and gain access to the device. To access and/or use applications that are on the computing device (e.g., a game, a social networking application, a video player, etc.), a user may need to unlock the lock screen, find the desired application, and start the desired application. This may cause a delay when the user wishes to quickly access an application on the computing device (e.g., an email application, etc.). In addition, if the lock screen re-locks the device (e.g., the lock screen re-locks the device after a period of inactivity), the user may have to unlock the device again and find the desired application again. Users may be frustrated when they try to quickly access an application but cannot quickly access the application because of the lock screen.

SUMMARY

In general, this disclosure relates to systems and methods of providing an overlay user interface (UI) on a computing device. The overlay UI may be displayed in a way that obscures part or all of a main user interface (e.g., a home screen) of the computing device, and may have an appearance that is similar to that of a lock screen. The overlay UI includes icons associated with a number of applications that can be executed by the computing device.

When a user slides a touch object (e.g., a finger, a stylus) on an icon associated with an application, the overlay UI may launch the application associated with the icon. The launched application may be displayed underneath the overlay UI as the overlay UI animates away to reveal the launched application.

According to one general aspect, a computer-implemented method can include displaying a first user interface window on a touchscreen display of a computing device. The first user interface window can include a plurality of application icons associated with respective applications available for execution by the computing device. The method can further include detecting a touch input on the touchscreen display at a location associated with a first application icon from the plurality of application icons. The method can also include, in response to the touch input, displaying, concurrently on the touchscreen display of the computing device, a first portion of the first user interface window and a second portion of a second user interface window, where the second user interface window displays a user interface of the application associated with the first application icon.

Implementations can include one or more of the following features. For example, the touch input can include a first dragging gesture from the location. The method can include, in response to the first dragging gesture, displaying a decreasing portion of the first user interface window on the display and displaying an increasing portion of the second user interface window on the display. The first dragging gesture can be performed in a direction that is perpendicular to, and away from, a first edge of the display. Displaying the decreasing portion of the first user interface window on the display can include moving the first user interface window away from the first edge of the display. Displaying the increasing portion of the second user interface window can include revealing the increasing portion of the second user interface window under the first user interface window as the first user interface window is moved.

The method can include detecting, after the first dragging gesture, a release of the touch input from the touch input surface. In response to the detected release of the touch input from the touch input surface, the method can include removing the first user interface window from the display and displaying the entire second user interface window on the display.

The method can include detecting a second dragging gesture on the touch input surface, the second dragging gesture can occur after the first dragging gesture and be performed perpendicular to, and toward, the first edge of the display. In response to the second dragging gesture, the method can include moving the first user interface window toward the first edge of the display. In response to the second dragging gesture, the method can include concealing the increasing portion of the second user interface window under the first user interface window as the first user interface window is moved toward the first edge of the display.

Detecting that the second dragging gesture can be performed within a predetermined distance from the first edge of the display. In response to detecting that the second dragging gesture is performed within the predetermined distance, the method can include maximizing the first user interface window on the display and closing the second user interface window on the display. In response to the second dragging gesture, the method can include launching the application associated with the first application icon and placing the application into a limited execution mode.

Displaying the second portion of the second user interface window on the display can include displaying a portion of a screenshot of a most recently used user interface to the application associated with the first application icon. Displaying the second portion of the second user interface window on the display can include launching the application associated with the first application icon, updating the second user interface window to include content provided from the application since a previous time that the application was launched, and displaying a second portion of the updated second user interface.

Displaying the first user interface window on the display can include launching an application associated with the first interface window. The launching of the application can cause a currently running application to be placed into a limited execution mode. The launched application can include a transparent window.

In another general aspect, a method can include displaying, on a screen of a computing device, an overlay user interface that provides an interface for previewing applications available for execution by the computing device. The overlay user interface can include icons that reference the applications. The method can further include detecting a first user input selecting one of the icons, and generating and displaying a preview of the application referenced by the selected icon, where generating the preview can include performing a limited execution of the application to acquire information for generating the preview.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
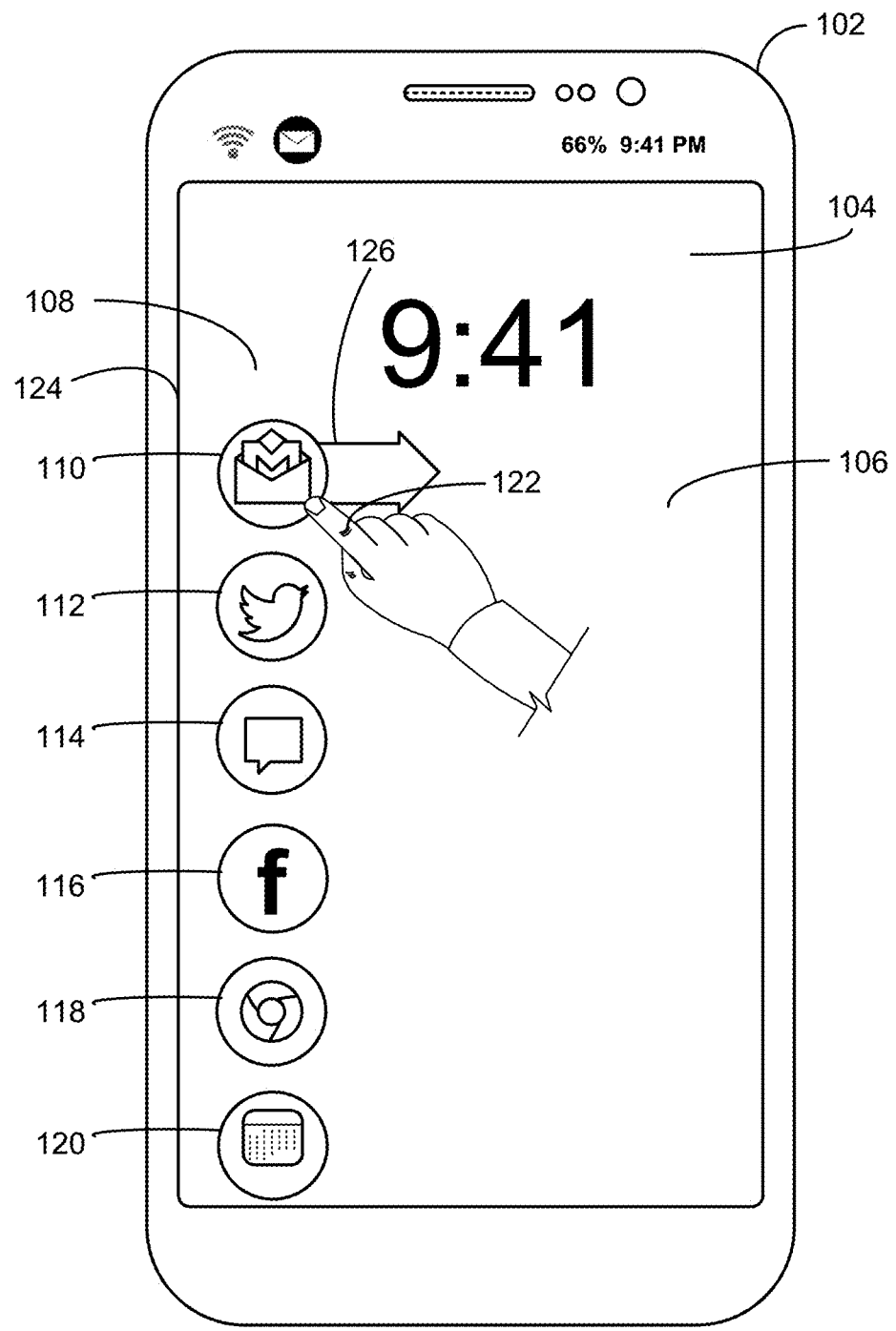
FIGS. 1A, 1B, and 1C are schematic diagrams illustrating graphical user interfaces (UIs) to applications that may execute on a computing device.
Figure 1B:
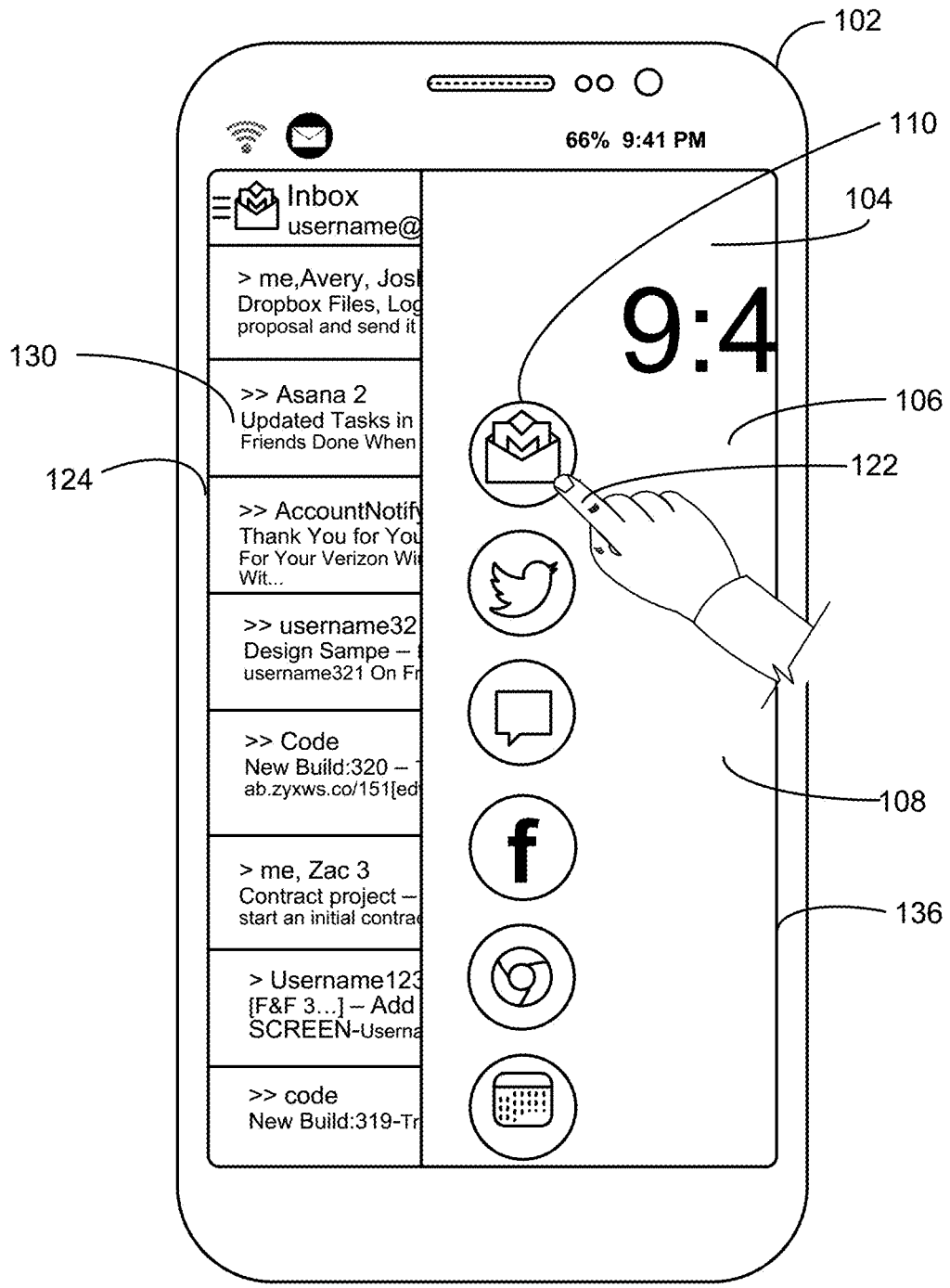
Figure 1C:
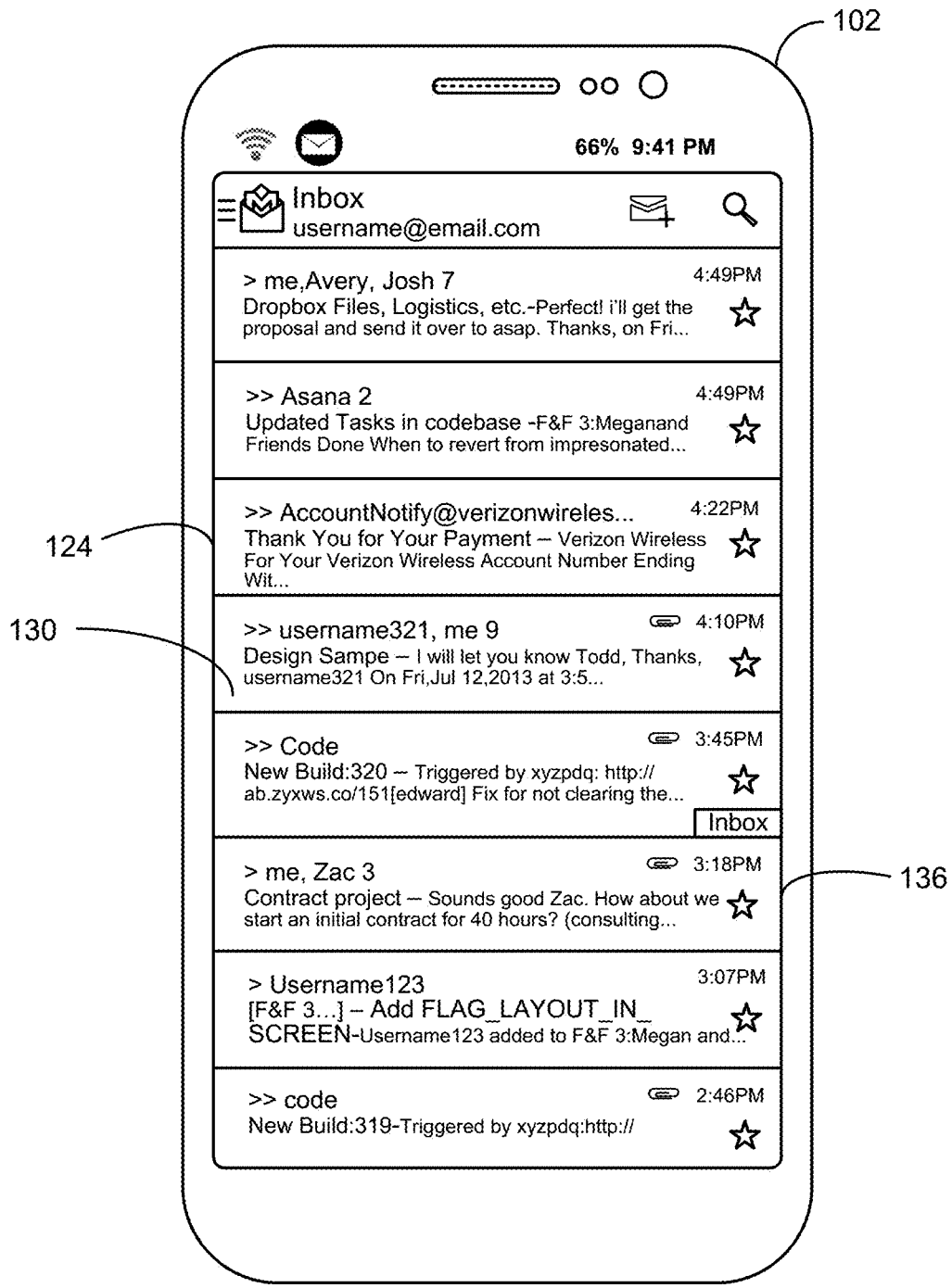

FIGS. 1A, 1B, and 1C are schematic diagrams illustrating graphical user interfaces (UIs) to applications that may execute on a computing device 102. As shown in FIG. 1A, the computing device 102 can be a smart phone, but in some implementations, the computing device 102 can be a tablet computer, a PDA, a laptop computer, smart thermostat, vehicle computer system, etc. The computing device includes a display 104 on its front surface where the display is overlaid with a touch input surface 106 that can be used to receive input from a user. For example, a user may provide input through the touch input surface by using his or her fingers to touch, tap, double tap, long tap, drag, pinch, expand, etc. on the touch input surface. In some implementations, the user may also use a stylus to provide input through the touch input surface.

As illustrated in FIG. 1A, an overlay application 514 executing on the device 102 includes functionality to display an overlay user interface (UI) 108 in all, nearly all, or a majority of the area of the display 104. In one implementation, the overlay UI 108 may obscure a main UI (e.g., a home screen) of the computing device. In another implementation, the overlay UI 108 may perform functions similar to a lock screen. In a further implementation, the overlay UI 108 may replace the lock screen of the computing device and/or may be used instead of the lock screen for the computing device. A small area outside the overlay UI 108 may be used for providing system-level information, such as, for example, icons that provide notifications related to applications (e.g., the existence of a new email message), icons providing information about a status of the computing device (e.g., that the devices connected to a Wi-Fi network, that the battery of the device is charged to a certain percentage of its full capacity, etc.), a current time, etc. The user interface elements in this area outside the overlay UI 108 may be managed by the operating system's background processes separately from the overlay application 514 or operating system process that manages the display of the overlay UI 108. The user may interact with the area that provides system-level information, such as, for example, by swiping downward with a touch object over the area to launch a new user interface that provides further information about one or more of the notifications or information in the small area.

The overlay UI 108 includes icons associated with one or more applications that are on the computing device. For example, the overlay UI 108 includes icons associated with an email application 110 (e.g., an application that allows a user to view, send and/or receive email), a blogging application (e.g., an application that allows users read and/or write to a blog or news feed) 112, a messaging application (e.g., an application that allows a user to send messages, such as short message service (SMS) 114 messages), a social networking application (e.g., an application that allows users to access and use a social networking site to post and view content) 116, a browser application (e.g., an application that allows the user to browse the internet, such as a web browser) 118, and a calendar application (e.g., an application that allows the user to view or schedule appointments and/or tasks) 120.

As illustrated in FIG. 1A, a user may view the overlay UI 108 and may touch the touch input surface of the display 104 with a touch object 122 (e.g., a finger or a stylus) at a location corresponding to an application icon 110 to select the icon 110. The user may drag the touch object 122 towards the right, away from an edge 124 of the display in a direction generally perpendicular to the edge, as indicated by arrow 126. As the user slides the touch object 122 towards the right after having selected icon 110, the overlay UI 108 may also slide towards the right within the display 104.

As illustrated in FIG. 1B, when the user slides the touch object 122 towards the right, away from the edge 124, after having selected icon 110, at least a portion of the overlay UI 108 may also slide towards the right, along with the touch object 122. In response to dragging the icon 110 away from the edge 124, an application associated with the icon is selected, and a graphical user interface 130 to the application appears underneath the overlay UI 108. In one implementation, dragging the icon 110 away from the edge 124 can cause the application associated with the icon 110 to launch (e.g., to begin execution or to resume execution from a non-executing state). In one implementation, dragging the icon 110 away from the edge 124 can cause a previously stored screenshot of a user interface to the application associated with the icon 110 to be displayed underneath the overlay UI 108. Thus, with a quick and simple gesture, a user may quickly access a view of the application associated with the dragged icon 110. Although a user interface 130 to the application associated with the icon 110 is shown in FIG. 1B, it is understood that selecting and dragging other icons 112, 114, 116, 118, 120 away from the edge 124 of the display would cause user interfaces to the respective application associated with the dragged icon to be displayed underneath the overlay UI 108.

Thus, the overlay application 514 can be configured to enable a user to preview (e.g., peek) at an application as the user slides the overlay UI 108 to the right. For example, as illustrated in FIG. 1B, the user can view a portion of the UI for the email application associated with the dragged icon 110 and can view whether the email application has received new emails. The user may also preview or peek at other applications associated with the other icons 112, 114, 116, 118, 120 on the overlay UI 108.

In one implementation, as illustrated in FIG. 1C, the user can dismiss (e.g., hide and/or close) the overlay UI 108 by sliding the overlay UI 108 to the right and away from the edge 124 of the display 104 all the way across the display. In response, the overlay application 514 may cause the underlying application associated with the dragged icon 110 to enter a fully interactive read/write mode where the user may fully interact with and/or use the application. For example, although the user may view content of the email application through the user interface 130 shown in FIG. 1B, the user may be unable to select or view an entire email message or may be unable to compose a new email within the user interface 130. However, after the overlay UI 108 has been dismissed, as illustrated in FIG. 1C, the user may be able to use all of the features and/or functions of the email application (e.g., view an email, delete an email, move an email to another folder or location, compose an email, etc.). In another implementation, the overlay UI 108 can be dismissed in response to the touch object 122 being lifted off the touch input surface 106 when (as shown in FIG. 1B) both the overlay UI 108 and the UI 130 of the application associated with the dragged icon 110 are displayed on the display 104.

As shown in FIG. 1B, after the user peeks at the user interface 130 to the application associated with the dragged icon 110, the user may drag the icon 110 to the left toward the edge 124 of the display 104. As a consequence of this dragging of the icon 110 back toward the location from which it originated (as shown in FIG. 1A), at least a portion of the overlay UI 108 also may slide to the left. When the icon 110 is dragged to a position on the display 104 that is within a predetermined threshold distance from the edge 124, the overlay application 514 can dismiss the user interface 130 to the application associated with the icon 110 and can again display the overlay UI 108 as shown in FIG. 1A, i.e., with the overlay UI 108 occupying all, nearly all, or a majority of the area of the display 104.

After the overlay UI 108 and has been returned to its position as shown in FIG. 1A, the user can then select a different icon 112 (e.g., a blogging application) to drag away from edge 124 using the touch object 122 and thereby slide the overlay UI 108 to the right to reveal a user interface 132 to the application associated with the icon 112, as illustrated below in FIGS. 2A, 2B, 2C. The overlay UI 108 allows the user to preview, or peek at, multiple applications in quick succession by sliding the overlay UI 108 partway across the display 104, viewing each application's content but not interacting with it (e.g., viewing the content in read-only mode). The overlay UI 108 may allow the user to more easily and/or more quickly check for new email messages, check for new text messages, check the time of a calendar event, etc.

Figure 2A:
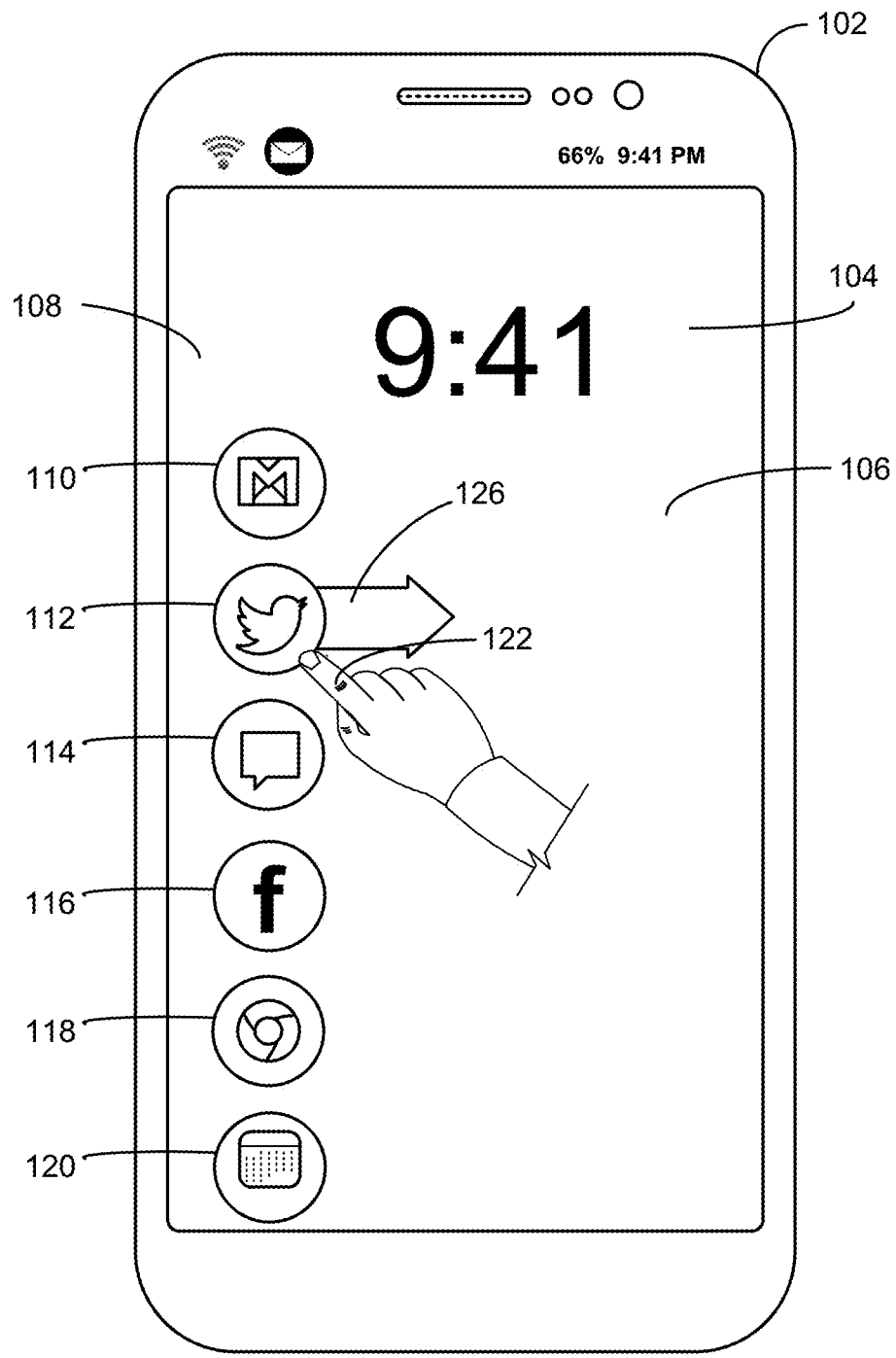
FIGS. 2A, 2B, and 2C are schematic diagrams illustrating additional UIs to applications that may execute on a computing device.
Figure 2B:
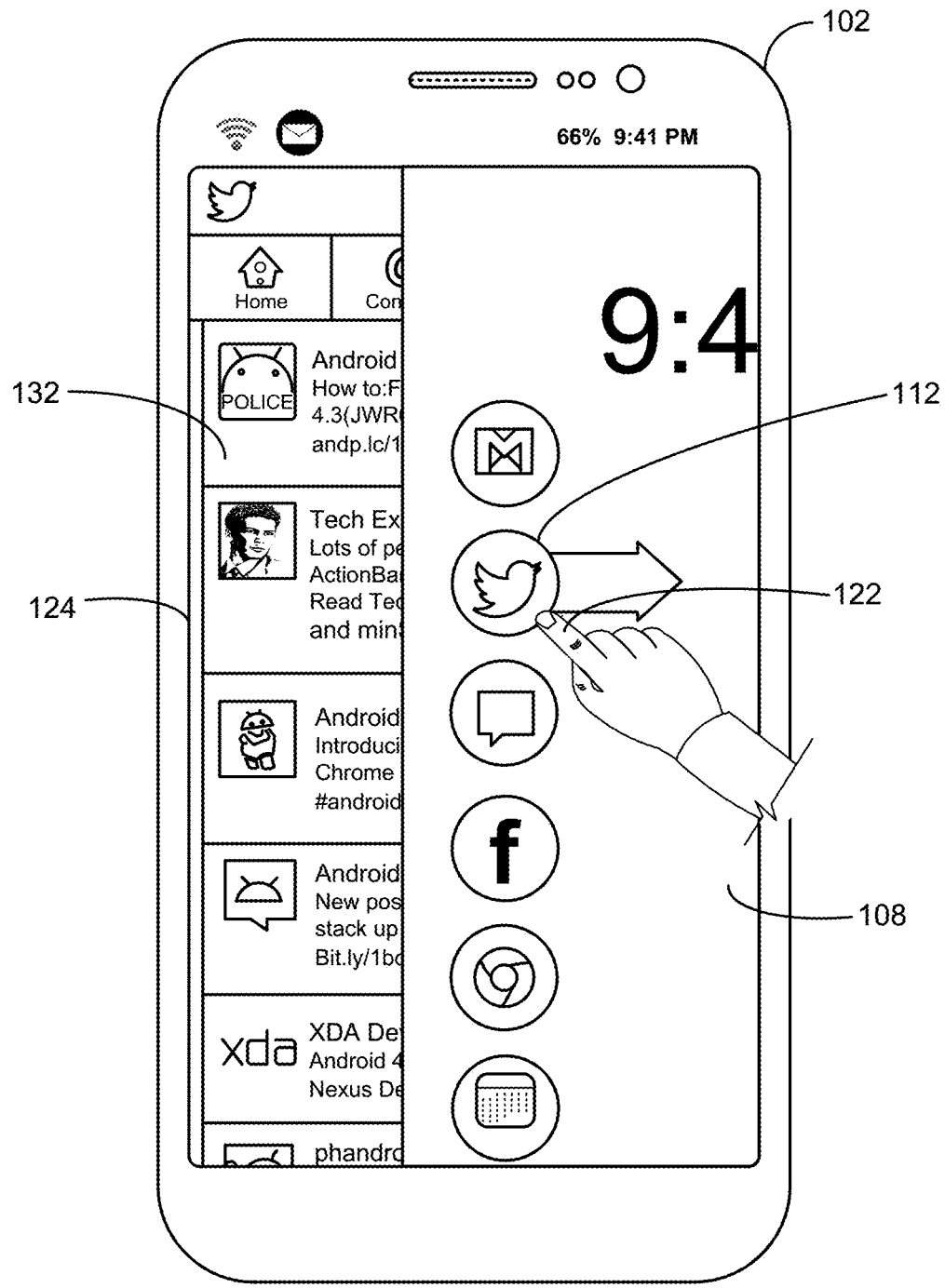
Figure 2C:
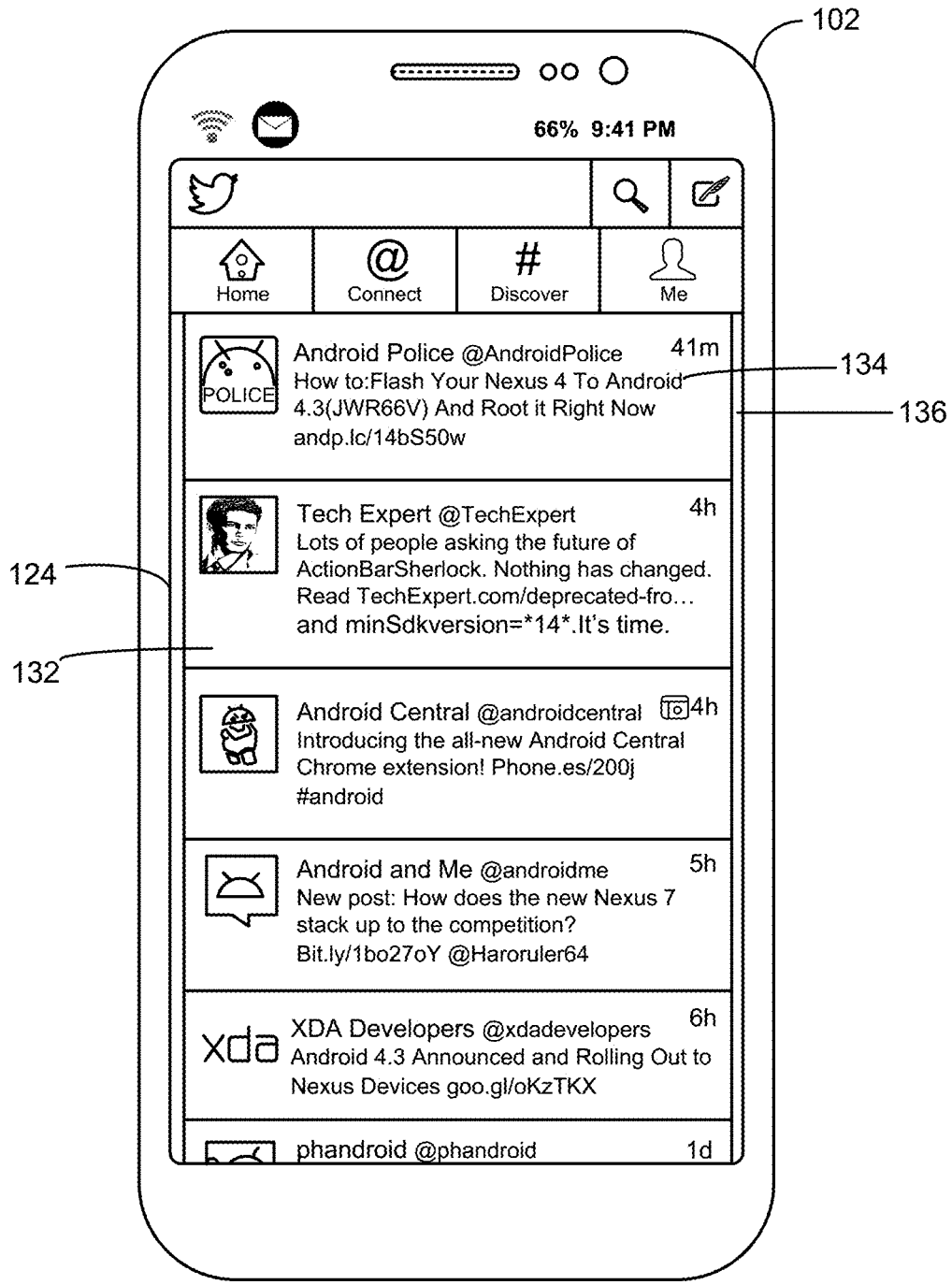

FIGS. 2A, 2B, and 2C are schematic diagrams illustrating additional graphical user interfaces (UIs) to applications that may execute on a computing device. The overlay application 514 and overlay UI 108 may obscure a main UI (e.g., a home screen) of the computing device, may perform functions similar to a lock screen, and/or may replace the lock screen of the computing device and/or may be used instead of the lock screen for the computing device.

The overlay UI 108 includes icons 110, 112, 114, 116, 118, 120 associated with one or more applications that are on the computing device (e.g., an email application, a blogging application, a messaging application, a social networking application, and a calendar application). As illustrated in FIG. 2A, a user may view the overlay UI 108 and may touch or select one of the icons 112 (e.g., the icon associated with a blogging application) using a touch object 122 (e.g., a finger or a stylus). In FIG. 2B, the user may swipe or slide a touch object 122 away from edge 124 of the display towards the right as indicated by arrow 126. As the user slides the touch object 122 away from edge 124, the overlay UI 108 may also slide towards the right. The application associated with the icon 112 selected by the interaction of the touch object 112 with the touch input area 106 of the display 104 (e.g., the blogging application) appears underneath the overlay UI as the UI 108 slides to the right. In one implementation, the overlay application 514 may cause the application associated with the icon 112 to launch (e.g., to begin execution or to resume execution from a limited execution (e.g., low-power hibernation) mode). In another implementation, the overlay application 514 displays a screenshot of a previous state of the application as a preview. For example, the screenshot can depict a state of the application when the application was last executing in a non-low-power hibernation mode on the computing device 102.

In one implementation, the user can preview (e.g., peek) at an application corresponding to the dragged icon 112 as the user drags the icon and slides the overlay UI 108 to the right away from edge 124. For example, as illustrated in FIG. 2B, the user can view a portion of the UI 132 for the blogging application and, when the blogging application is executing (i.e., not in a low-power hibernation mode), the user can view new blog posts (e.g., post 134) presented in the application since the last time the user interacted with the application. The overlay UI 108 may also allow the user to preview or peek at multiple applications in quick succession by sliding the overlay UI 108 midway across the screen, viewing each application's content but not interacting with it (e.g., viewing the content in read-only mode).

In one implementation, as illustrated in FIG. 2C, the overlay application 514 dismisses (e.g., hides and/or closes) the overlay UI 108 in response to a user sliding the overlay UI 108 all the way across the screen to the right or to within a predetermined threshold or right hand edge 136 of the display 104. The overlay UI one 108 also may be dismissed, and the underlying application may be launched, by selecting an icon and then sliding the icon away from the edge 124 at a speed that is greater than a threshold speed. The overlay application 514 may launch the underlying application in a fully interactive read/write mode (e.g., full execution mode) where the user may fully interact and/or use the application.

Although icons 110, 112, 114, 116, 118, 120 are illustrated in the figures, it should be understood that the applications that are accessible from the overlay UI 108 may be represented using different methods. For example, one icon on the overlay UI 108 may be touched and/or selected to reveal more icons (such as with a quick contact dial) or preview content (such as browser favorites). For these icons, swiping from a primary icon (e.g., a first icon) to the secondary icon (e.g., a second icon) would "deep link" into an application. At this point the user may drag his or her finger to the right away from first edge 124 and to within a predetermined threshold distance of second edge 136, or the user may lift the touch object 122 off the touch input surface 106 after the underlying UI of the application has been exposed, to instruct the overlay application 514 to dismiss the overlay UI 108 and launch the deep linked application in a non-low-power mode and to display a user interface to the deep linked application in a full-screen of the display 104. For example, an icon representing the user's spouse (e.g., a thumbnail or picture of the user's spouse) may be displayed within the overlay UI 108. Touching the icon representing the user spouse may reveal a set of application icons representing applications with which the user may communicate with the spouse (e.g., a messaging application, a phone application, an email application, etc.). If the user drags from the spouse's icon to the messaging icon, and then drags to the right, the overlay application 514 may launch the messaging application in a state such that a UI of the messaging application shows a previous thread of a conversation between the user and the user's spouse.

As described herein, the overlay UI 108 may include visible visual elements that can be moved and animated on the display 108 in response to the interaction of the touch object 122 with the touch input surface 106.

Figure 3:
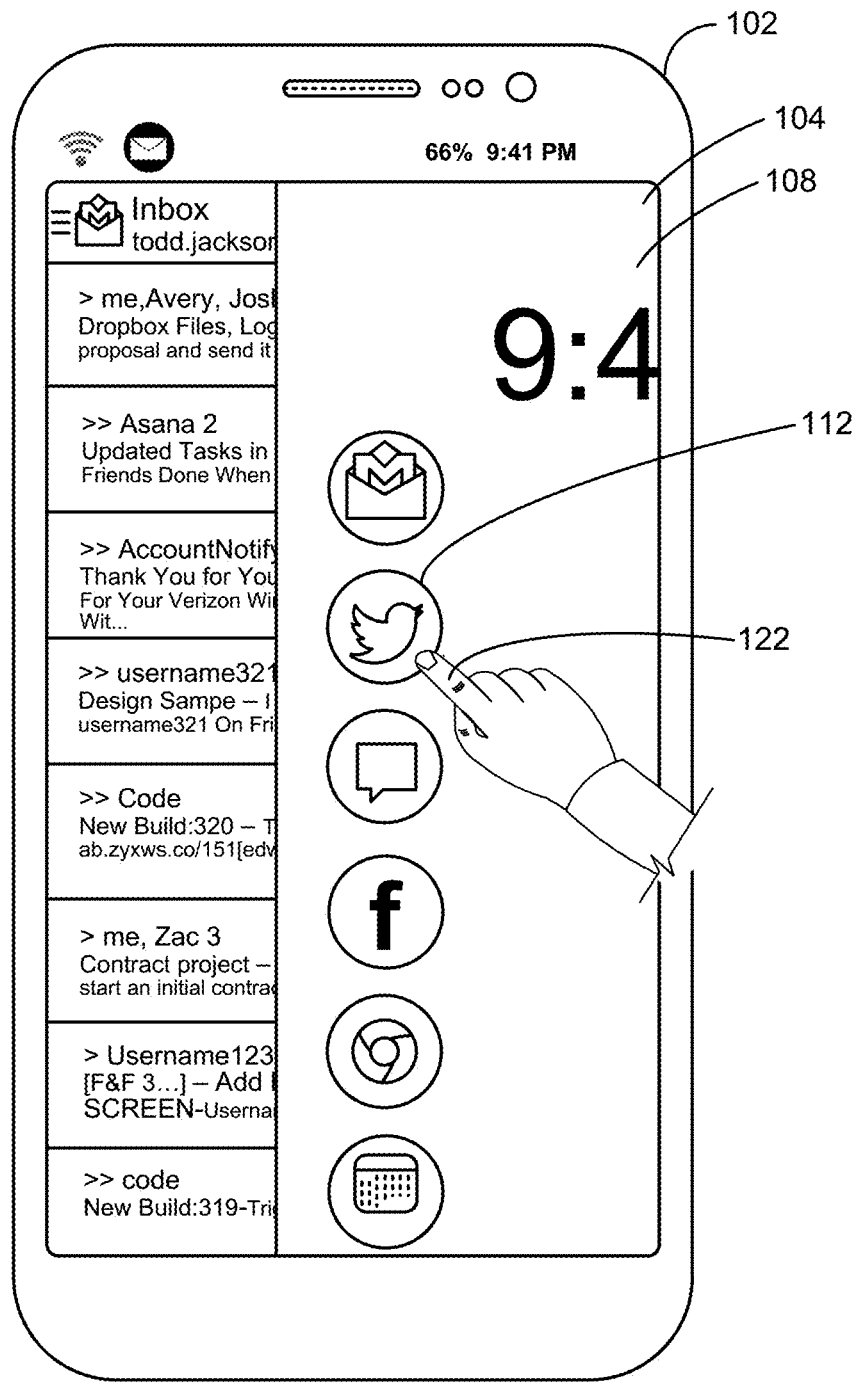
FIG. 3 is a diagram illustrating an overlay graphical user interface.

FIG. 3 is a diagram illustrating an overlay graphical user interface. In one implementation, the overlay UI 108 includes a user interface that may be displayed, drawn, rendered, and/or presented on a display 104 of the computing device 102 (e.g., over a home screen of a computing device and/or over other applications). As the user selects and drags an icon 112 with a touch object 122 (e.g., a finger or a stylus), an animation where the overlay UI 108 slides in the direction of the touch object 122 is presented to the user. For example, the overlay UI 108 may appear to slide in the direction of a user's finger swipe. As the overlay UI 108 slides in a direction, the overlay application 514 may generate and display a preview of an application associated with the icon 112 selected by the user underneath the overlay UI. The overlay application 514 may also display the user interface 132 associated with the application. The overlay UI 108 may present the user with the impression that the application was sitting underneath the overlay UI 108 and the impression that the user is simply moving the overlay UI 108 out of the way of the application, or dismissing the overlay UI 108, to access the underlying application. The applications are launched seemingly instantly underneath the overlay UI 108 as the user slides the overlay UI 108 with the touch object 122. The overlay application 514 may launch the underlying application as soon as the touch object 122 presses down on the icon 112 with the touch object 122.

In one implementation, the overlay UI 108 may be presented or rendered such that the overlay UI 108 obscures the user's home screen and other applications. In some implementations, other applications may obscure the overlay UI, when the applications are programmed to automatically become front-facing above all other applications within the display 104 in particular instances.

In one implementation, the overlay UI 108 may provide the user with fast access to applications when the user activates and/or turns on their computing device. In some implementations, the overlay UI 108 may be provided as a standalone application that executes on the computing device 102. In other implementations, the overlay UI 108 may be presented as part of the operating system of the computing device (e.g., may be presented as if it were the lock screen that is provided by the operating system). In one implementation, the overlay UI 108 may completely obscure running or executing applications on the computing device. In other implementations, the overlay UI 108 may be semi-transparent, so that a user interface for another application may be viewed through the semi-transparent visual elements of the overlay UI. As illustrated above in FIGS. 1A-1C and 2A-2C, the overlay UI 108 may be moved (e.g., may slide or may be dismissed) to reveal a portion of, or the entire, user interfaces of running applications (e.g., to reveal a portion of the content of a running application. Although the overlay UI 108 is shown as sliding to the right in FIGS. 1B and 2B, in other implementations, the overlay UI 108 may be slid in any direction (e.g., left, right, up, down, diagonal, etc.).

In one implementation, the overlay UI 108 may occupy the full-screen of the display 104 until the user tries to preview an application or dismiss the overlay UI. This allows two different types of interactions with the applications: 1) a read-only mode or interaction where the user can only view content of the applications; and 2) a read-write mode or interaction where the user can use all of the functions and/or operations of the applications.

In one implementation, the overlay UI 108 may be configured in such a way that the user cannot interact with any underlying applications while any portion of the overlay UI is visible on the display 104. This may prevent the user from interacting with the underlying app until the overlay UI 108 is completely dismissed.

In one implementation, the overlay UI 108 may be configured to reveal a portion of an interface to an underlying application, where the revealed portion has been determined as likely to be the most useful portion of the user interface (e.g., such as the upper-left corner of the user interface in western societies that typically place dominant elements on the left side), or the overlay UI 108 switch to a different orientation depending on the user context. For example, if the computing device 102 is programmed to display content in a language that is read from right to left, then application icons 110, 112, 114, 116, 118, 120 can be displayed in proximity to a right hand edge 136 of the display 104, and the icons can be dragged to the left away from the edge to reveal underlying applications.

In one implementation, the overlay application 514 may identify the icons and/or applications selected by a user for presentation by the overlay UI 108. For example, the overlay application 514 may prompt the user (using a different graphical user interface such as a setup menu or a configuration menu) to select one or more applications. The overlay application 514 may obtain the icons associated with those applications and display those icons on the overlay UI 108 (as illustrated in FIGS. 1A-1C and 2A-2C). In another implementation, the overlay application 514 may receive the applications that are to be accessible from the overlay UI 108 from another component of the computing device (e.g., from another application such as an application that automatically analyzes and ranks importance or value to a user of applications that are on the computing device). For example, a component of the overlay application 514 (or service, a daemon, etc.) may monitor the applications used by a user during certain times of the day (e.g., mornings, evenings, etc.) or at certain locations (e.g., at a user's home, at a user's work place, etc.). The overlay application 514 may provide the applications that are most often used or are most likely to be used by the user to the overlay UI 108, and the overlay UI 108 may display the icons with these applications on the display.

In one implementation, the overlay application 514 may re-enable the overlay UI in response to user input. For example, after the display 104 has been dimmed or turned off to see power on the computing device 102, the overlay application 514 may re-enable the overlay UI 108. In this example, a user may press a power button or some other physical button or soft button on the computing device to re-enable the overlay UI. In another example, the overlay application 514 may re-enable the overlay UI 108 after it has been dismissed in response to a user. In this example, so the user can view a user interface to an underlying application, the user may re-enable the overlay UI 108 by swiping or dragging a touch object 122 in direction opposite to the direction that was used to reveal the underlying UI (e.g., by swiping a finger from the right edge 136 to the left edge 130 of the display 104).

Figure 4A:
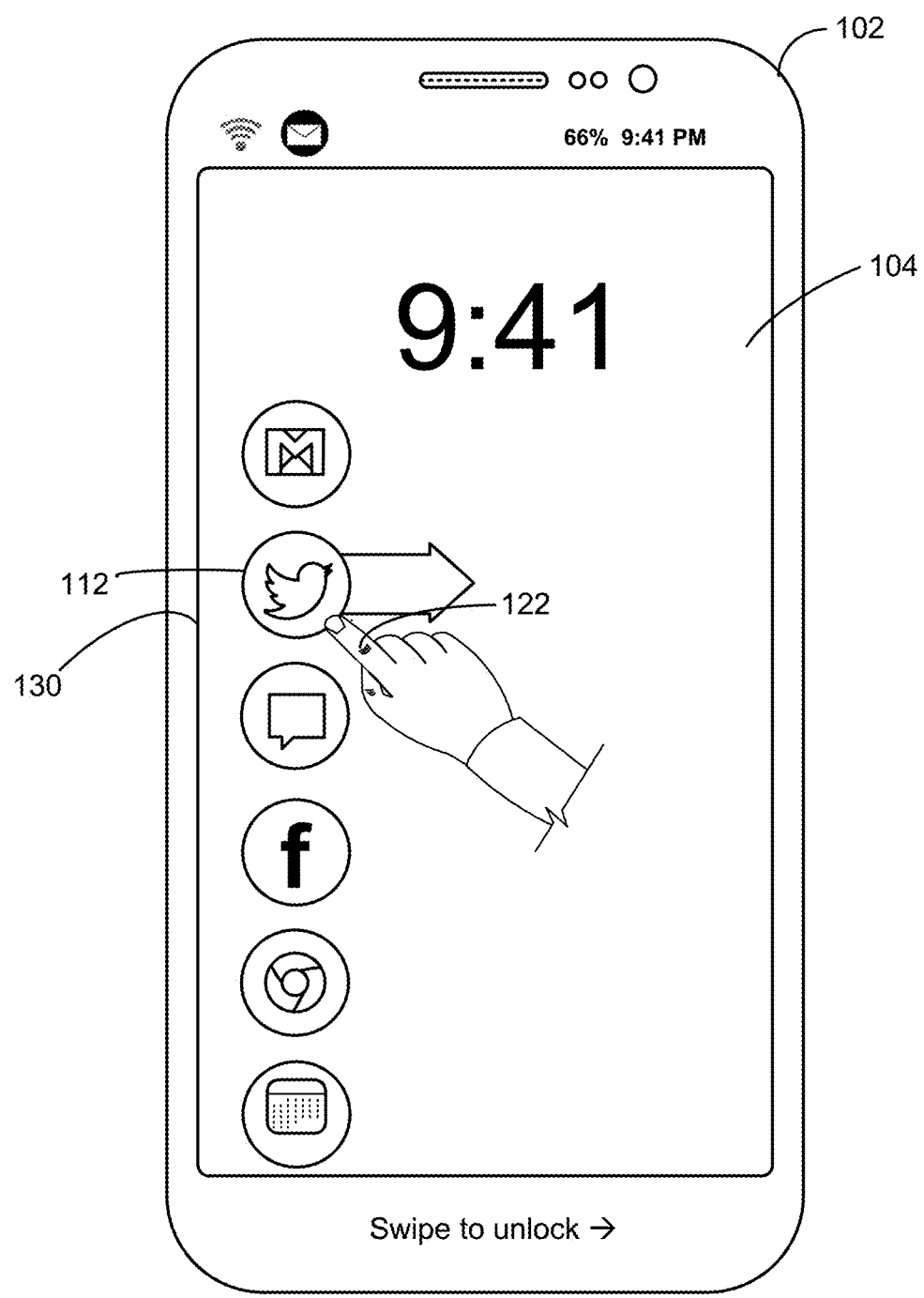
FIGS. 4A, 4B are schematic diagrams illustrating additional overlay user interfaces when a lock screen is present on a computing device.
Figure 4B:
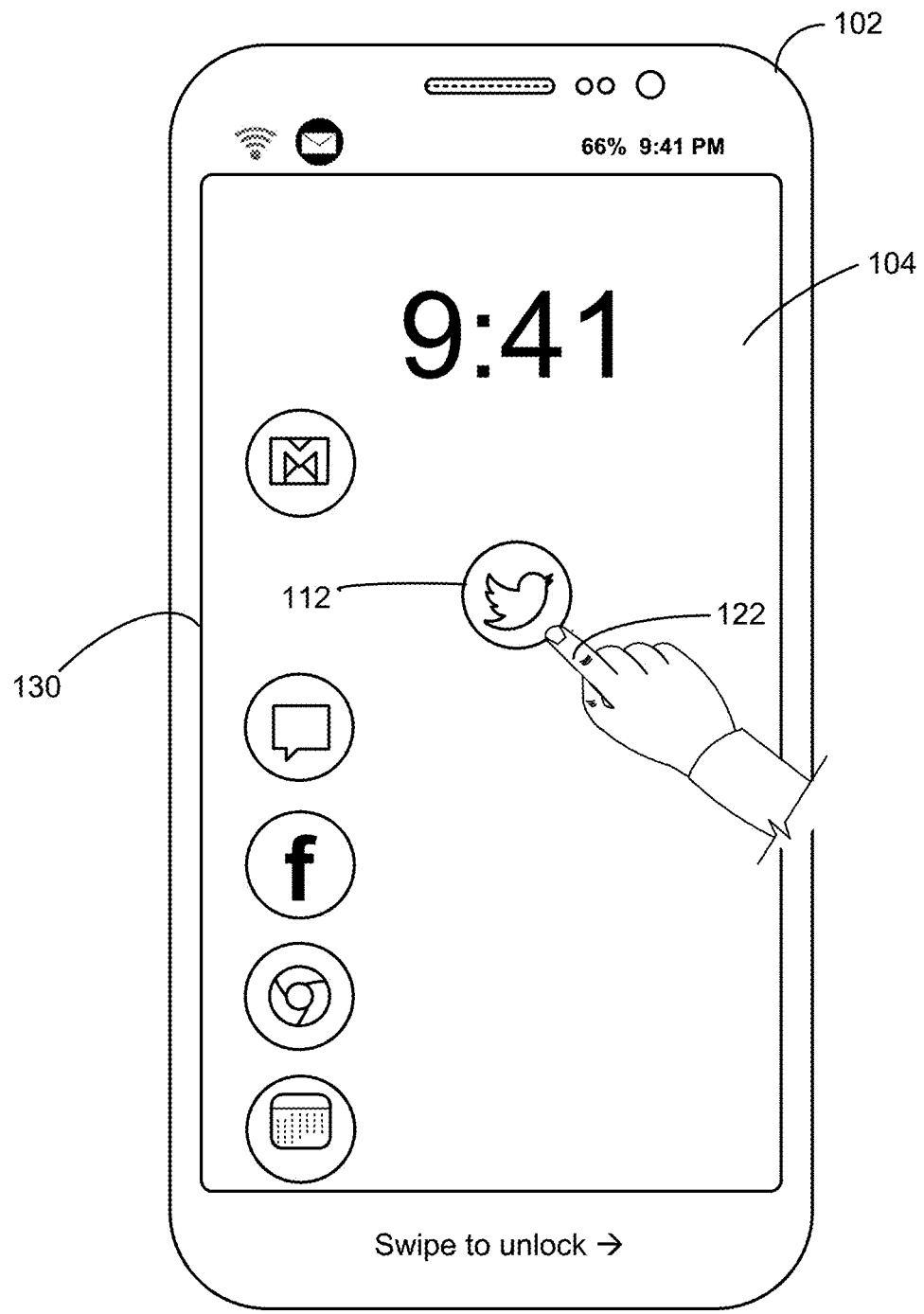

FIGS. 4A, 4B are schematic diagrams illustrating additional overlay user interfaces (UIs) when a lock screen is present on a computing device. In some implementations, the overlay UI 108 may replace a lock screen that is provided by an operating system of the computing device 102 or that is provided by a manufacturer of the computing device (e.g., a factory installed lock screen). The overlay UI 108 may allow users to more easily and quickly launch applications and/or to preview content of applications directly from the overlay UI 108, rather than navigating through an existing lock screen.

Referring to FIGS. 4A and 4B, in one implementation, the computing device 102 may be configured to present a secure unlocking interface that requires entry of a PIN code, biometric input, or pattern drawing before applications are launched and/or access to the computing device 102 is granted. The overlay application 514 may automatically detect that the computing device 102 requires such input before launching applications, and when the user touches an icon 112 to launch an application associated with the icon 112, the overlay application 514 may keep the overlay UI 108 in place while only the icon 112 is moved in response to the user drag or swipe gesture. If the user performs a drag or swipe gesture to indicate that they wish to launch the application (e.g., by swiping an application icon to the right beyond a predetermined distance from the left hand edge 130 of the display 104 and then releases the touch object 122 from contact with the touch input surface 106), the entire overlay UI 108 may be hidden and may be dismissed and the secure unlocking interface may be presented, so that the user may unlock the computing device 102 by entering the required input to the secure unlocking interface. When the user has successfully unlocked the device, then the application associated with the dragged icon 112 may be launched in a full-screen, full execution mode (e.g., non-low power mode), so that the user would be able to interact with the application. In this implementation, the overlay application 514 may not present the user with peek or preview functionality but instead would delay launch of the application associated with the drag icon 112 until after the device has been securely unlocked. Then, after the device had been securely unlocked, the overlay application 514 automatically launches the application associated with the dragged icon 112.

In another implementation, the computing device 102 may be configured to only present a secure unlocking interface when the device has been inactive for a predetermined period of time (e.g. after 15 minutes of inactivity). When the overlay UI 108 is launched upon locking of the user's phone, the overlay application 514 may determine the state of the phone to determine whether the secure unlocking interface is required to use the phone, and the overlay application 514 may automatically switch the behavior of the overlay UI between different interaction methods to provide the user with the different interaction functionality given the current state of the phone. For example, if the user turns on the device's display screen 104 after a period of inactivity that exceeds the predetermined period of time for the secure unlocking interface to take effect, the user may then touch and drag an icon 112 corresponding to a blogging application to launch the blogging application. The secure unlocking interface would be presented because the secure lock timeout period has been exceeded. The user may then unlock the phone, use the blogging application, and manually lock the computing device 102 or leave the device and an unlocked state.

Figure 5:
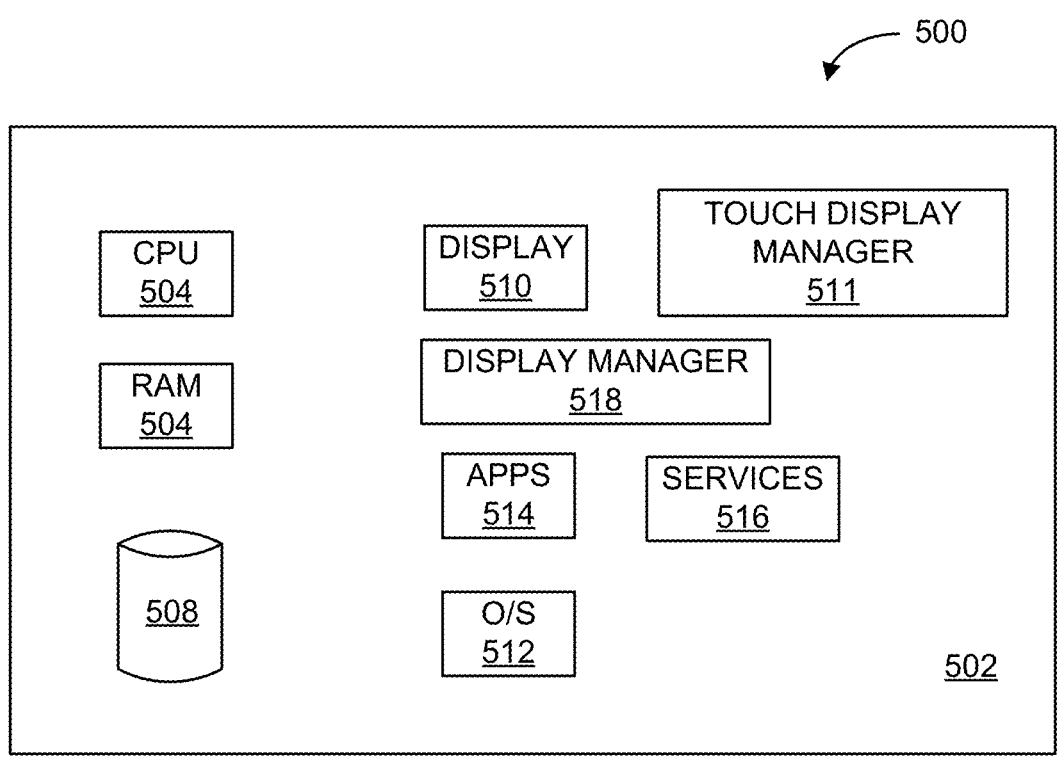
FIG. 5 is a schematic diagram of a system for displaying an overlay user interface on a computing device.

FIG. 5 is a schematic diagram of a system 500 for displaying an overlay user interface on a computing device, which can be a mobile computing device (e.g., a smart phone, PDA, tablet, or laptop computer). System 500 can include a computing device 502 that can include one or more processors (e.g., including a central processing unit, a graphics processor, etc.) 504, volatile memory 506, and nonvolatile memory 508. In various implementations, the volatile memory 506 may store, for example, instructions that are executed by the processor(s) 504, and the nonvolatile memory 508 may store, for example, various user data, instructions for executing an operating system, applications, etc. The computing device 502 includes a display 510 that can provide information to a user (e.g., including overlay user interface 108) and that can receive input from a user for example, through touch input surface 106. The display 510 can correspond to the display 104 of FIGS. 1A, 1B, 1C, 2A, 2B, 2C, 3, 4A, 4B. A touch input manager 511 can manage multi-touch inputs to the touch input surface 106 of the display 510.

The computing device 502 can include an operating system 512 and a plurality of applications 514, which can be executed by the computing device 502 (e.g., by the processor 504 executing one or more instructions stored in memory 506 that correspond to the application) and which may communicate with the operating system (e.g., through one or more application programming interfaces (APIs)). The applications 514 can be make use of various services 516. Execution of the applications 514 can provide various functionality to a user of the computing device 502. Although more than one application can be running at time, in some implementations (e.g., in the case of a smart phone), the size of the display is generally suitable for only one executing application to be displayed at a time. The executing application that is displayed on the display 118 can be referred to as a "front-facing" application.

A display manager 518 can manage, in coordination with execution of the operating system 512 and the applications 514, the display of information on the display 510 and the receipt of inputs from a user through the touch input surface on the display.

Many computing devices 102, provide a multi-tasking environment, in which different applications may be loaded into memory and may execute concurrently. Many mobile computing devices (e.g., smart phones, tablets, PDAs) 102 having small displays (e.g., less than or equal to 9 inch displays) generally provide one "foreground" or "front-facing" application at a time. Other "background" applications within the multi-tasking environment that are not front-facing may be maintained in a limited execution mode (e.g., a low-power hibernation mode) until the user invokes a background application to become front-facing, at which point the application is woken from its hibernation mode and is placed into a full execution mode.

In one or more embodiments, other aspects of the application (besides power dependent functionality) can be limited or disabled when an application is executed in limited execution mode. The application developer may program what portions of the application remain executing when an application is invoked or placed in a limited execution (e.g., when the application is no longer front-facing and is placed into a low-power hibernation mode). For example, a mapping and navigation application that becomes non-front-facing may shut down its use of a GPS transceiver; an email application that becomes non-front-facing may shut down its communications with an online server that are used to synchronize local email content with content on the server; and a blogging application that becomes non-front-facing may similarly shut down its communications with a server and cease pulling new content from the server. However, when a music streaming application becomes non-front-facing, the application may continue to pull content from a server so that music may continue to be streamed to the user of the computing device 102, even when the music streaming application is no longer front facing. Similarly, a phone application, even when non-front-facing may continue to execute a process that monitor a mobile network interface of the computing device for incoming phone calls, and a calendar application may monitor a database of calendar events and a clock of the computing device, so that the user may be notified of upcoming calendar events. Some applications that are not front-facing and that are running in background may be automatically placed into a front-facing execution mode in response to one or more events. For example, a phone application may automatically become front facing upon the receipt of an incoming phone call. A background application that becomes front-facing may cause the user interface for the application to obscure the overlay UI 108, so that higher-priority information may be presented over the overlay UI 108.

In some implementations, an overlay application 514 that provides the overlay UI 108 can include a transparent "front-facing" application component. When the overlay UI 108 covers the entire display or a predefined portion of the display, the transparent application may put any other currently-running "front-facing" application into a limited execution mode. The application is transparent in that it provides no visual user elements, so that a screenshot of an underlying application that exists in a limited execution mode can be viewed on the display, even when the transparent application component is front facing. The transparent application component may serve to provide lifecycle management functionality for the overlay UI 108 with respect to other executing applications in the multi-tasking environment on the computing device 102.

This transparent "front-facing" application component can also perform roles of capturing touches and notify the overlay application 514 of its own application life cycle, such as when it itself has been placed in a limited execution mode. In this example, the transparent "front-facing" application component may be subsumed by another application that the user launches via another method such as a notifications panel that exists above the overlay UI, and that causes the overlay UI subsequently to be dismissed.

The overlay UI 108 may be provided by a service component of the overlay application 514, which persists even when the transparent application component is subsumed by another application. For example, when the overlay UI 108 is slid to the right, away from edge 124 to preview a user interface to an underlying application, the overlay application 514 may launch the underlying application and place it into a front-facing mode (e.g., converted to full execution mode), although the portion of the overlay UI 108 may remain on the display, for example, as shown in FIG. 1B and FIG. 2B.

Thus, the overlay application 514 may dismiss the transparent application component when the overlay UI 108 is moved to expose at least a portion of an underlying application. The overlay application 514 or operating system may promote the underlying application to front-facing status, such that it is brought out of a low-power hibernation mode and is placed into a full execution mode. This transition of the underlying application to full execution mode may occur as soon as the user interacts with an application icon on the overly UI 108, even before the overlay UI is moved, so that the user may preview a user interface to the application associated with the application icon.

In some implementations, when a user selects an icon 112 within the overlay UI 108, the overlay application 514 invokes an application associated with the icon 112 and launches the application associated with the icon 112 in a limited execution mode, where the limited execution mode provides more functionality than the hibernation mode but not the full functionality of the full execution mode. The functionality of the limited execution mode may include functionality of the application to acquire information for generating a preview of the application.

In one implementation, in response to the user's selection of the icon 112, the operating system 512 may call the application associated with the icon 112 to request a limited execution preview for the current state of the application. In one implementation, a current state of the application may refer to the state that the application would normally open into at that time in full execution mode. For example, for an email application, if the user had previously viewed his or her inbox in the email application, the limited execution mode may request the application to prepare a low power version of this inbox view using only whatever data that is currently available in the memory 506, 508, without making a network request for updates to the status of the inbox.

In another implementation, the current state of the application may be a special UI in which the application displays changes that have occurred since the last time the user interacted with the application. In some implementations, the special UI that is surfaced to the user may provide notification-style content related to the application associated with the selected icon. For example, for an email application, if the user has multiple folders into which incoming email is routed, the special UI may provide a notification of how many new messages exist in each of the folders. In another example, for a social network application, the special UI may provide notification of how many new events are associated with particular contacts who are connected to the user through the social network application. The contacts for whom notifications are provided in the special UI may be contacts who had a ranking that exceeds a threshold ranking, so that notifications are provided only for the most important contacts of the user.

To provide the special UI, the application associated with the selected icon 112 may produce on-demand "live" UI elements (e.g., a set of bitmaps, or perhaps a set of serialized UI elements for an operating system process to display, etc.), which are provided to the operating system. The operating system may ask the application to prepare on-demand live UI elements and may display a progress bar or temporary media in the special UI while it waits for the application to prepare this content asynchronously.

Power restrictions on an application, which determine what resources the application may utilize when prompted to provide a preview of the application when operating in the limited execution mode, may apply in various combinations depending on the current power availability on the computing device 102. For example, the application may be permitted disk access and CPU usage, so long as a response to the operating system could be provided within a threshold time limit (e.g., 100 milliseconds).

Figure 6:
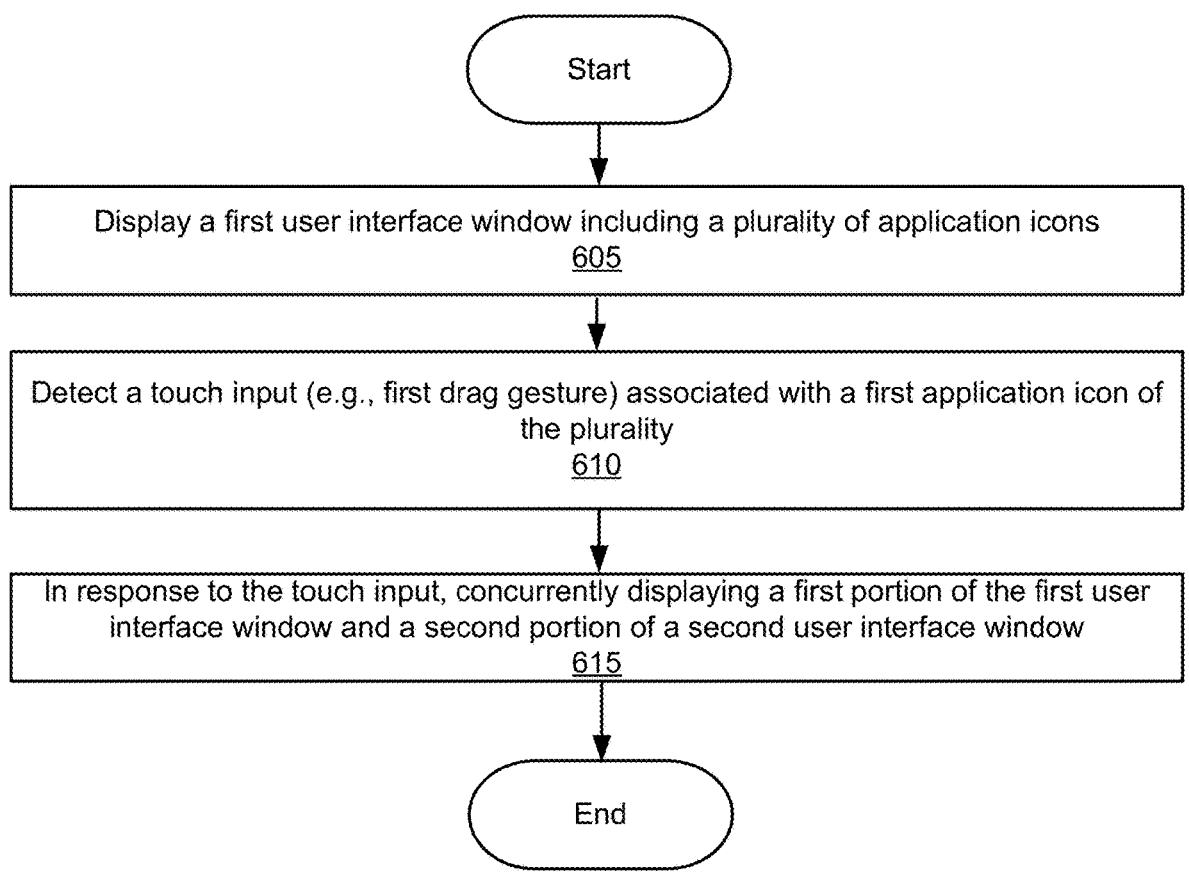
FIG. 6 is a flow chart illustrating a method of utilizing an overlay user interface on the computing device.

FIG. 6 is a flow chart illustrating a method of utilizing an overlay user interface on the computing device. For simplicity of explanation, the method illustrated in FIG. 6 is depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods disclosed herein could alternatively be represented as a series of interrelated states via a state diagram or events. The method may be performed by processing logic that comprises hardware (e.g., circuitry, dedicated logic, programmable logic, microcode, etc.), software (e.g., instructions run on a processor to perform hardware simulation), or a combination thereof.

The method of FIG. 6 includes, at block 605, displaying a first user interface window on a touchscreen display of a computing device wherein, the first user interface window includes a plurality of application icons associated with respective applications available for execution by the computing device. At block 610, the method includes detecting a touch input on the touchscreen display at a location associated with a first application icon from the plurality of application icons. At block 615, the method includes, in response to the touch input, displaying concurrently on the touchscreen display of the computing device a first portion of the first user interface window and a second portion of a second user interface window, wherein the second user interface window displays a user interface of the application associated with the first application icon. In other embodiments, a method can include other operations and features, such as those described herein with respect to FIGS. 1A-5 and 7.

Figure 7:
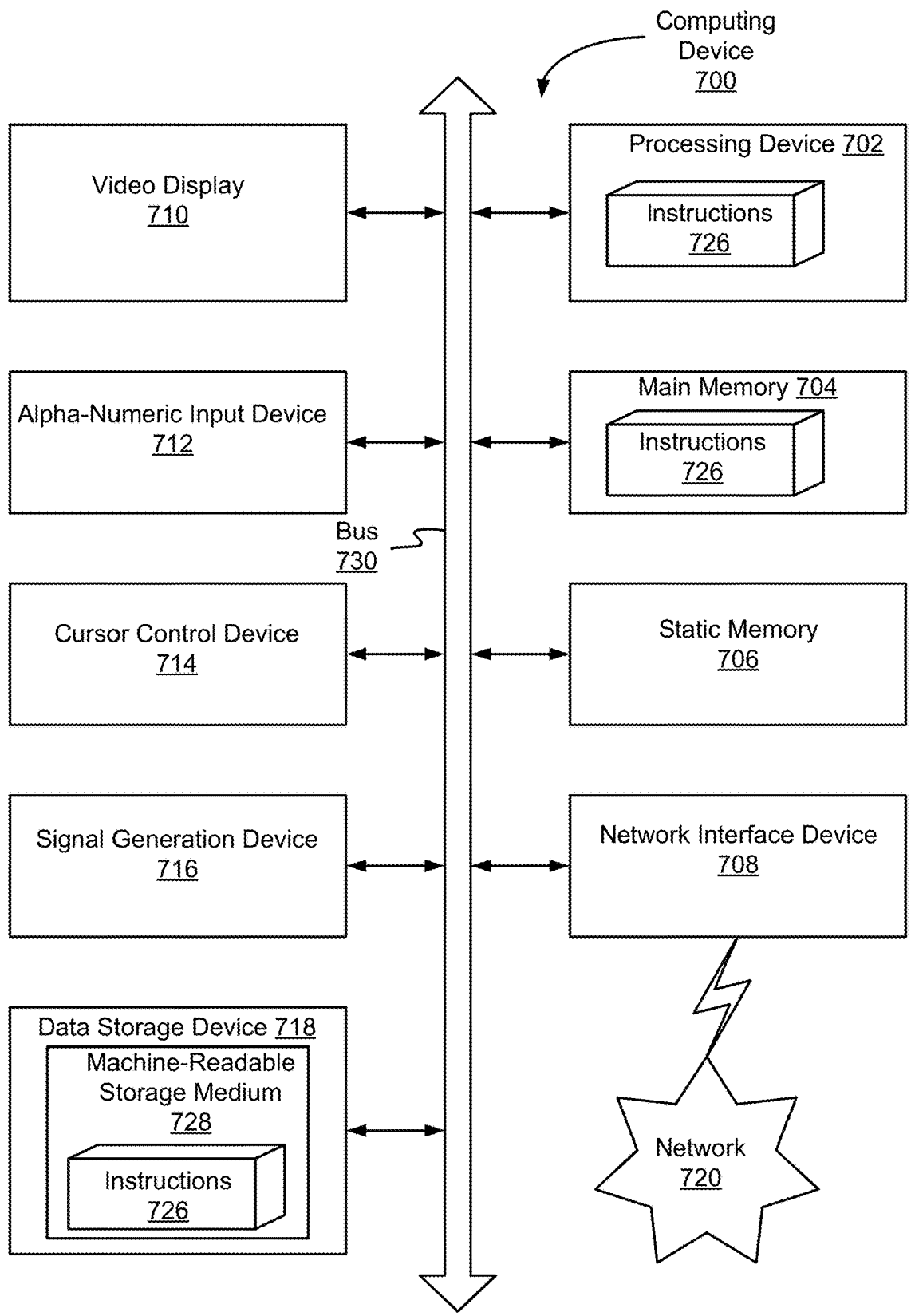
FIG. 7 shows an example of a computer device and a mobile computer device that can be used to implement the techniques described here.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the overlay application 514 executing on the computing device 700 may present an overlay UI 108 to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 (e.g., instructions for an application ranking system) for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one implementation, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions 726 (e.g., instructions for the application ranking system) embodying any one or more of the methodologies or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
displaying a first user interface window on a touchscreen display of a computing device, wherein the first user interface is displayed to occupy the full-screen of the touchscreen display, wherein the first user interface window includes a plurality of single instances of different application icons, each application icon associated with a respective different application available for execution by the computing device upon selection of the application icon in the first user interface window via a touch input on the touchscreen display;
detecting, when the first user interface is displayed to occupy the full-screen of the touchscreen display, a touch input on the touchscreen display at a location at which a first application icon from the plurality of different application icons is displayed and a first dragging gesture of the touch input on across the touchscreen display; and
in response to the first dragging gesture of the touch input:
displaying concurrently on the touchscreen display of the computing device a first portion of the first user interface window, wherein the first portion includes the different application icons, and a second portion of a second user interface window, wherein the second user interface window displays a user interface of the application associated with the first application icon including a screenshot depicting a state of the application when the application was last executing in a non-low-power hibernation mode on the computing device, and wherein the first portion includes an edge that moves, along with the different application icons that all move synchronously with the edge away from a first edge of the display, in response to the first dragging gesture to reveal the second portion in a portion of the display over which the edge has moved;
launching the application associated with the first application icon, wherein launching the application includes beginning execution of the application or resuming execution of the application from the non-low-power hibernation mode;
updating the second portion of the second user interface window, while the first portion of the first user interface window and the second portion of the second user interface are concurrently displayed, to include content provided from the application since a previous time that the application was launched;
displaying the second portion of the updated second user interface;
detecting a second dragging gesture on the touch input surface, the second dragging gesture occurring after the first dragging gesture and performed toward, the first edge of the display;
in response to the second dragging gesture, moving the first user interface window toward the first edge of the display; and
in response to the second dragging gesture, concealing the increasing portion of the second user interface window under the first user interface window as the first user interface window is moved toward the first edge of the display.

2. The method of claim 1, further comprising:
in response to the first dragging gesture, displaying a decreasing portion of the first user interface window on the display and displaying an increasing portion of the second user interface window on the display.

3. The method of claim 2,
wherein the first dragging gesture is performed in a direction that is perpendicular to, and away from, the first edge of the display,
wherein displaying the decreasing portion of the first user interface window on the display includes moving the first user interface window away from the first edge of the display, and
wherein displaying the increasing portion of the second user interface window includes revealing the increasing portion of the second user interface window under the first user interface window as the first user interface window is moved.

4. The method of claim 3, further comprising:
detecting, after the first dragging gesture, a release of the touch input from the touch input surface; and
in response to the detected release of the touch input from the touch input surface, removing the first user interface window from the display and displaying the entire second user interface window on the display.

5. The method of claim 1, wherein
the second dragging is performed perpendicular to the first edge of the display.

6. The method of claim 5, further comprising:
detecting that the second dragging gesture is performed within a predetermined distance from the first edge of the display;
in response to detecting that the second dragging gesture is performed within the predetermined distance, maximizing the first user interface window on the display and closing the second user interface window on the display.

7. The method of claim 6, further comprising:
in response to the second dragging gesture:
placing the application into a limited execution mode.

8. The method of claim 1, wherein displaying the second portion of the second user interface window on the display includes displaying a portion of a screenshot of a most recently used user interface to the application associated with the first application icon.

9. The method of claim 1, wherein displaying the first user interface window on the display includes launching an application associated with the first interface window, wherein the launching of the application causes a currently running application to be placed into a limited execution mode.

10. The method of claim 9, wherein the launched application includes a transparent window.

11. The method of claim 1, wherein a plurality of application icons displayed in the first user interface window each are circular shaped and include a graphical image.

12. The method of claim 1, wherein an amount of the revealed second portion is proportional to an extent of the first dragging gesture.

13. The method of claim 1, wherein the first dragging gesture of the touch input on the touchscreen display, includes a dragging gesture in a direction that corresponds to a direction in which the edge moves in response to the first dragging gesture.

14. The method of claim 1 wherein displaying the first user interface to occupy the full-screen of the touchscreen display includes displaying the first user interface on all of the display area of the touchscreen display.

15. A non-transitory computer readable storage medium including instructions that, when executed by at least one processor, cause a computing device to:
   display a first user interface window on a touchscreen display of a computing device, wherein the first user interface is displayed to occupy the full-screen of the touchscreen display, wherein the first user interface window includes a plurality of single instances of different application icons, each application icon associated with a respective different application available for execution by the computing device upon selection of the application icon in the first user interface window via a touch input on the touchscreen display;
   detect, when the first user interface is displayed to occupy the full-screen of the touchscreen display, a touch input on the touchscreen display at a location at which a first application icon from the plurality of different application icons is displayed and a first dragging gesture of the touch input on the touchscreen display; and
   in response to the first dragging gesture of the touch input:
      display concurrently on the touchscreen display of the computing device a first portion of the first user interface window, wherein the first portion includes the different application icons, and a second portion of a second user interface window, wherein the second user interface window displays a user interface of the application associated with the first application icon including a screenshot depicting a state of the application when the application was last executing in a non-low-power hibernation mode on the computing device, and wherein the first portion includes an edge that moves, along with the different application icons that all move synchronously with the edge away from a first edge of the display, in response to the first dragging gesture to reveal the second portion in a portion of the display over which the edge has moved;
      launch the application associated with the first application icon, wherein launching the application includes beginning execution of the application or resuming execution of the application from the non-low-power hibernation mode;
      update the second portion of the second user interface window, while the first portion of the first user interface window and the second portion of the second user interface are concurrently displayed, to include content provided from the application since a previous time that the application was launched;
      display the second portion of the updated second user interface;
      detect a second dragging gesture on the touch input surface, the second dragging gesture occurring after the first dragging gesture and performed toward, the first edge of the display;
      in response to the second dragging gesture, move the first user interface window toward the first edge of the display; and
      in response to the second dragging gesture, conceal the increasing portion of the second user interface window under the first user interface window as the first user interface window is moved toward the first edge of the display.

16. The computer readable storage medium of claim 15, wherein the instructions, when executed by at least one processor, further cause the computing device to:
   in response to the first dragging gesture, display a decreasing portion of the first user interface window on the display and displaying an increasing portion of the second user interface window on the display.

17. The computer readable storage medium of claim 15, wherein the first dragging gesture is performed in a direction that is perpendicular to, and away from, the first edge of the display,
   wherein displaying the decreasing portion of the first user interface window on the display includes moving the first user interface window away from the first edge of the display, and
   wherein displaying the increasing portion of the second user interface window includes revealing the increasing portion of the second user interface window under the first user interface window as the first user interface window is moved.

18. The computer readable storage medium of claim 17, wherein the instructions, when executed by at least one processor, further cause the computing device to:
   detect, after the first dragging gesture, a release of the touch input from the touch input surface; and
   in response to the detected release of the touch input from the touch input surface, remove the first user interface window from the display and displaying the entire second user interface window on the display.

19. The computer readable storage medium of claim 15, wherein
   the second dragging gesture is performed perpendicular to the first edge of the display.

20. The computer readable storage medium of claim 19, wherein the instructions, when executed by at least one processor, further cause the computing device to:
   detect that the second dragging gesture is performed within a predetermined distance from the first edge of the display;
   in response to detecting that the second dragging gesture is performed within the predetermined distance, maximize the first user interface window on the display and close the second user interface window on the display.

21. The computer readable storage medium of claim 20, wherein the instructions, when executed by at least one processor, further cause the computing device to, in response to the second dragging gesture place the application into a limited execution mode.

22. The computer readable storage medium of claim 15, wherein displaying the second portion of the second user interface window on the display includes displaying a portion of a screenshot of a most recently used user interface to the application associated with the first application icon.

23. The non-transitory computer readable storage medium of claim 15, wherein the first dragging gesture of the touch input on the touchscreen display, includes a dragging gesture in a direction that corresponds to a direction in which the edge moves in response to the first dragging gesture.

24. The non-transitory computer readable storage medium of claim 15 wherein displaying the first user interface to occupy the full-screen of the touchscreen display includes displaying the first user interface on all of the display area of the touchscreen display.

25. A computing device comprising:
a touchscreen display;
at least one processor; and
at least one non-transitory computer readable storage medium including instructions that, when executed by the at least one processor, cause the computing device to:
display a first user interface window on the touchscreen display, wherein the first user interface is displayed to occupy the full-screen of the touchscreen display, wherein the first user interface window includes a plurality of single instances of different application icons, each application icon associated with a respective different application available for execution by the computing device upon selection of the application icon in the first user interface window via a touch input on the touchscreen display;
detect, when the first user interface is displayed to occupy the full-screen of the touchscreen display, a touch input on the touchscreen display at a location at which a first application icon from the plurality of different application icons is displayed and a first dragging gesture of the touch input on the touchscreen display; and
in response to the first dragging gesture of the touch input:
display concurrently on the touchscreen display a first portion of the first user interface window, wherein the first portion includes the different application icons, and a second portion of a second user interface window, wherein the second user interface window displays a user interface of the application associated with the first application icon including a screenshot depicting a state of the application when the application was last executing in a non-low-power hibernation mode on the computing device, and wherein the first portion includes an edge that moves, along with the different application icons that all move synchronously with the edge away from a first edge of the display, in response to the first dragging gesture to reveal the second portion in a portion of the display over which the edge has moved;
launch the application associated with the first application icon, wherein launching the application includes beginning execution of the application or resuming execution of the application from the non-low-power hibernation mode;
update the second portion of the second user interface window, while the first portion of the first user interface window and the second portion of the second user interface are concurrently displayed, to include content provided from the application since a previous time that the application was launched;
display the second portion of the updated second user interface;
detect a second dragging gesture on the touch input surface, the second dragging gesture occurring after the first dragging gesture and performed toward, the first edge of the display;
in response to the second dragging gesture, move the first user interface window toward the first edge of the display; and
in response to the second dragging gesture, conceal the increasing portion of the second user interface window under the first user interface window as the first user interface window is moved toward the first edge of the display.

26. The computing device of claim 25, wherein the instructions, when executed by at least one processor, further cause the computing device to:
in response to the first dragging gesture, display a decreasing portion of the first user interface window on the display and displaying an increasing portion of the second user interface window on the display.

27. The computing device of claim 26,
wherein the first dragging gesture is performed in a direction that is perpendicular to, and away from, the first edge of the display,
wherein displaying the decreasing portion of the first user interface window on the display includes moving the first user interface window away from the first edge of the display, and
wherein displaying the increasing portion of the second user interface window includes revealing the increasing portion of the second user interface window under the first user interface window as the first user interface window is moved.

28. The computing device of claim 27, wherein the instructions, when executed by at least one processor, further cause the computing device to:
detect, after the first dragging gesture, a release of the touch input from the touch input surface; and
in response to the detected release of the touch input from the touch input surface, remove the first user interface window from the display and displaying the entire second user interface window on the display.

29. The computing device of claim 25, wherein the second dragging gesture is performed perpendicular to the first edge of the display.

30. The computing device of claim 29, wherein the instructions, when executed by at least one processor, further cause the computing device to:
detect that the second dragging gesture is performed within a predetermined distance from the first edge of the display;
in response to detecting that the second dragging gesture is performed within the predetermined distance, maximize the first user interface window on the display and close the second user interface window on the display.

31. The computing device of claim 24, wherein the instructions, when executed by at least one processor, further cause the computing device to, in response to the second dragging gesture, place the application into a limited execution mode.

32. The computing device of claim 25, wherein displaying the second portion of the second user interface window on the display includes displaying a portion of a screenshot of a most recently used user interface to the application associated with the first application icon.

33. The computing device of claim 25, wherein the first dragging gesture of the touch input on the touchscreen display, includes a dragging gesture in a direction that corresponds to a direction in which the edge moves in response to the first dragging gesture.

34. The computing device of claim 25, wherein displaying the first user interface to occupy the full-screen of the touchscreen display includes displaying the first user interface on all of the display area of the touchscreen display.

\* \* \* \* \*